Patented Apr. 10, 1934

1,954,766

UNITED STATES PATENT OFFICE 1,954,766

MEDICINAL PHENOL COMPOUNDS

Robert P. Fischelis, Newark, N. J., assignor to The Maltbie Chemical Company, Newark, N. J., a corporation of New Jersey No Drawing. Application January 2, 1930, Serial No. 418,163

4 Claims. (Cl. 260—154)

In the use of phenols for medicinal and pharmaceutical purposes it has been proposed heretofore to administer the phenol in the form of a compound of calcium. This method has been extensively and successfully employed for a number of years, but I have found that magnesium-phenol compounds are notably more advantageous for the purpose mentioned. In the first place certain magnesium compounds (those of the monohydroxyphenol type) are considerably more soluble in water, sugar solutions, etc., than the calcium compounds. The magnesium compounds can also be administered in larger doses without discomfort to the patient, and since they contain no calcium these larger doses do not introduce correspondingly large amounts of calcium into the body. On the other hand, in cases where calcium is desirable a reasonable proportion of the calcium compound may be administered in admixture with the magnesium compound without too great sacrifice of solubility.

The more soluble magnesium-phenol compounds are conveniently produced by allowing magnesium oxid (or hydroxid) to react with the phenol in the presence of water at room temperature, the proportions of the phenol and the magnesium oxid or hydroxid being one molecular weight of each. Using wood tar creosote, the reaction gives a magnesium-phenol compound which is from one and a half to two times more soluble in water than are calcium compounds prepared in a similar way. Where solubility of the magnesium-phenol compound is not of paramount importance I may make a solution of the phenol (say creosol) in alkali and then by means of a magnesium salt, as for example sulfate or chlorid, precipitate the desired magnesium-phenol compound therefrom. Using guaiacol in the first method I obtained a compound of intermediate solubility. All the above reactions take place readily at room temperature.

The following are specific examples of the preferred methods of obtaining my new compounds.

A. 26.5 kg. of creosol are dissolved in a slight excess of 10 per cent sodium hydroxid solution, and a solution of 30 kg. of anhydrous magnesium sulfate is added slowly with stirring. The magnesium-phenol compound is precipitated as a white powder having a faint vanilla-like odor. It turns slightly brown on exposure to the air.

B. Sufficient water to form a paste is added to a mixture of 124 kg. of guaiacol and moist freshly precipitated magnesium hydroxid in amount corresponding to 40.3 kg. of the oxide. The mixture gradually sets to a cake in the course of an hour or two. It is dried in the air and powdered for use. The product thus obtained is a white powder, with a faint odor and taste of guaiacol. Dilute acids decompose it slowly into guaiacol and magnesium salt.

C. 70 liters of water are stirred into a mixture of 85 liters of wood tar creosote and 43.5 kg. of powdered magnesium oxide. The mixture gradually sets to a cake which can be easily dried and powdered. The product is grayish brown in color, permanent in the air, with the odor and taste of creosote. It is one and a half to two times as soluble as the calcium compound of creosote.

The magnesium-phenol compounds prepared as above contain water of crystallization or constitution. When dried at 100° C. they correspond generally to the formula $Mg(OH)OR$, in which R stands for the phenol radical. These compounds of magnesium, for example the creosote-magnesium compound obtained by Method C above, are especially adapted for medicinal use. They are acted upon only superficially by the carbon dioxide of the air and at ordinary temperatures they are attacked only slowly by dilute acids, though concentrated mineral acids decompose them at once, liberating the phenol and forming the magnesium salt of the acid.

It is to be understood that the invention is not limited to the particular examples herein specifically described but can be carried out in other ways without departure from its spirit as defined by the following claims.

I claim—

1. As a new medicinal and pharmaceutical product, a water-soluble compound of magnesium and the phenols of wood tar creosote.

2. As a new medicinal and pharmaceutical product, a compound of magnesium having the odor, taste, solubility, and resistance to attack by carbon dioxid and dilute acids characteristic of the solid product resulting from the reaction of wood tar creosote and magnesium oxid in the presence of water at ordinary temperatures.

3. As a new medicinal and pharmaceutical product, a composition of magnesium and the phenols of wood tar creosote, a substantial part of the composition being a chemical compound of the magnesium and at least one of said phenols.

4. As a new medicinal and pharmaceutical product, a compound of magnesium and phenolic material occurring in substantial quantity in wood tar creosote.

ROBERT P. FISCHELIS.